US012619308B2

(12) United States Patent
Yang et al.

(10) Patent No.: US 12,619,308 B2
(45) Date of Patent: May 5, 2026

(54) WEARABLE DEVICE FOR ELECTRO-QUASISTATIC HUMAN BODY COMMUNICATION AND A METHOD THEREOF

(71) Applicant: Quasistatics Inc., West Lafayette, IN (US)

(72) Inventors: David Yang, West Lafayette, IN (US); Shovan Maity, West Lafayette, IN (US); Shreyas Sen, West Lafayette, IN (US)

(73) Assignee: Quasistatics Inc., West Lafayette, IN (US)

( * ) Notice: Subject to any disclaimer, the term of this patent is extended or adjusted under 35 U.S.C. 154(b) by 0 days.

(21) Appl. No.: 18/739,634

(22) Filed: Jun. 11, 2024

(65) Prior Publication Data

US 2025/0190053 A1 Jun. 12, 2025

Related U.S. Application Data

(60) Provisional application No. 63/608,259, filed on Dec. 10, 2023.

(51) Int. Cl.
*G06F 3/01* (2006.01)
*G02B 27/01* (2006.01)
*G02C 5/14* (2006.01)

(52) U.S. Cl.
CPC ........... *G06F 3/015* (2013.01); *G02B 27/017* (2013.01); *G02C 5/14* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 10,078,917 B1 | 9/2018 | Gaeta et al. | |
| 10,816,807 B2 | 10/2020 | Polcak et al. | |
| 2015/0301644 A1* | 10/2015 | Walley .................. | G06F 3/0442 |
| | | | 345/174 |

(Continued)

FOREIGN PATENT DOCUMENTS

WO    WO-2018158347 A1    9/2018

*Primary Examiner* — Andre L Matthews
(74) *Attorney, Agent, or Firm* — Kevin J Fournier Intellectual Property Legal Services Ltd.; Kevin J Fournier

(57) ABSTRACT

The present disclosure provides a wearable device for electro-quasistatic human body communication and a method thereof. The wearable device includes sensors, a first set of conductors, and a second set of conductors. The wearable device includes a processor to generate a data packet for transmission to at least one computing device of a user. The processor applies an excitation voltage between the first set of conductors and the second set of conductors. As a result, the first set of conductors generates electro-quasistatic (EQS) signals and the second set of conductors applies the electro-quasistatic (EQS) signals to the user's body, thereby enabling human-body communication (HBC) for transmission of the data packet between the wearable device and the at least one computing device. Furthermore, the processor triggers a feedback module to generate a notification in response to the successful transmission of the data packet to the at least one computing device.

16 Claims, 11 Drawing Sheets

(56) References Cited

U.S. PATENT DOCUMENTS

2022/0193427 A1* 6/2022 Sen ..................... H04B 13/005
2023/0201518 A1* 6/2023 Ruttenberg ........... G16H 50/30
600/27

* cited by examiner

COMMUNICATION NETWORK 108

COMPUTING DEVICE 106

102

104

500

600

900

1000

Figure 12:
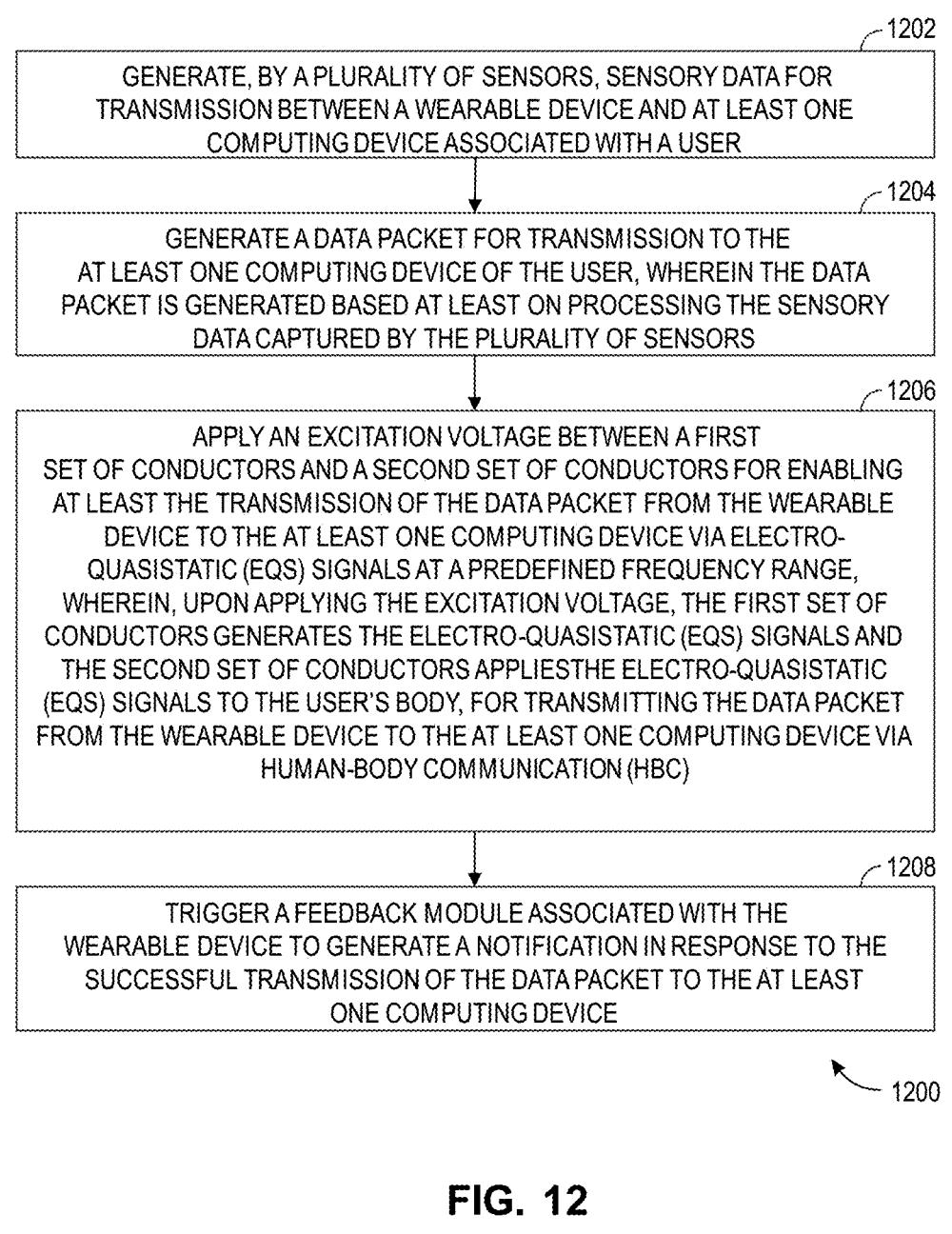

1202

GENERATE, BY A PLURALITY OF SENSORS, SENSORY DATA FOR TRANSMISSION BETWEEN A WEARABLE DEVICE AND AT LEAST ONE COMPUTING DEVICE ASSOCIATED WITH A USER

1204

GENERATE A DATA PACKET FOR TRANSMISSION TO THE AT LEAST ONE COMPUTING DEVICE OF THE USER, WHEREIN THE DATA PACKET IS GENERATED BASED AT LEAST ON PROCESSING THE SENSORY DATA CAPTURED BY THE PLURALITY OF SENSORS

1206

APPLY AN EXCITATION VOLTAGE BETWEEN A FIRST SET OF CONDUCTORS AND A SECOND SET OF CONDUCTORS FOR ENABLING AT LEAST THE TRANSMISSION OF THE DATA PACKET FROM THE WEARABLE DEVICE TO THE AT LEAST ONE COMPUTING DEVICE VIA ELECTRO-QUASISTATIC (EQS) SIGNALS AT A PREDEFINED FREQUENCY RANGE, WHEREIN, UPON APPLYING THE EXCITATION VOLTAGE, THE FIRST SET OF CONDUCTORS GENERATES THE ELECTRO-QUASISTATIC (EQS) SIGNALS AND THE SECOND SET OF CONDUCTORS APPLIES THE ELECTRO-QUASISTATIC (EQS) SIGNALS TO THE USER'S BODY, FOR TRANSMITTING THE DATA PACKET FROM THE WEARABLE DEVICE TO THE AT LEAST ONE COMPUTING DEVICE VIA HUMAN-BODY COMMUNICATION (HBC)

1208

TRIGGER A FEEDBACK MODULE ASSOCIATED WITH THE WEARABLE DEVICE TO GENERATE A NOTIFICATION IN RESPONSE TO THE SUCCESSFUL TRANSMISSION OF THE DATA PACKET TO THE AT LEAST ONE COMPUTING DEVICE

WEARABLE DEVICE FOR ELECTRO-QUASISTATIC HUMAN BODY COMMUNICATION AND A METHOD THEREOF

CROSS REFERENCE

This Application is based upon and derives the benefit of U.S. Provisional Application No. 63/608,259 filed on Dec. 10, 2023, the contents of which are incorporated herein by reference.

TECHNICAL FIELD

The present invention relates to communication interfaces, and more particularly relates to a wearable device (such as an augmented reality (AR) headset) for enabling Electro-quasistatic Human Body Communication (HBC) and a method thereof.

BACKGROUND

In recent times, there are numerous wireless devices available in markets for capturing various sensory signals of a user's body. Some examples of wireless devices may include wireless earbuds, smartwatches, smartphones, and virtual reality headsets. The wireless devices usually record sensor data (such as audio-visual data and biophysical signals) related to the user to at least one computing device for at least visualization of the sensor data or provide any sensory feedback to the user. The existing wearable device (e.g., augmented reality (AR) headset) utilizes a wired setup or a radio frequency (RF) electromagnetic (EM) wireless setup for transmitting sensory data around the body with the use of wired or wireless communication protocol. However, the wired communication protocol possesses form factor issues, hence the implementation of the wired communication protocol is not feasible for most of the applications.

Further, the wireless communication protocols (e.g., RF EM techniques) are widely used for the wireless transmission of data/signals between the wearable device and other computing devices. However, the RF EM techniques involve significant power losses, when used around the human body. Furthermore, the wireless communication protocols involve the risk of security and vulnerability as the signal is detectable between a transmitting point and a reception point.

Therefore, there is a need for a wearable device to enable Electro-quasistatic Human Body Communication (HBC) for efficiently transmitting data between the wearable device and a computing device to overcome the aforementioned limitation, in addition to providing other technical advantages.

SUMMARY

This section is provided to introduce certain objects and aspects of the present disclosure in a simplified form that are further described below in the detailed description. This summary is not intended to identify the key features or the scope of the claimed subject matter.

In one aspect, the present disclosure relates to a wearable device. The wearable device includes a plurality of sensors configured to generate sensory data for transmission to at least one computing device associated with a user. Further, the wearable device includes a first set of conductors mounted to at least a portion of a first support frame of the wearable device. The first set of conductors is in contact with a portion of a user's body during the operation of the wearable device. The wearable device includes a second set of conductors mounted to at least a portion of a second support frame of the wearable device. The second set of conductors is positioned in proximity to the user's body during the operation of the wearable device. The wearable device further includes a processor communicably coupled to the plurality of sensors, the first set of conductors, and the second set of conductors. The processor is configured to at least generate a data packet for transmission to the at least one computing device of the user. The data packet is generated based at least on processing the sensory data captured by the plurality of sensors. The processor is configured to apply an excitation voltage between the first set of conductors and the second set of conductors for enabling at least the transmission of the data packet from the wearable device to the at least one computing device via electro-quasistatic (EQS) signals at a predefined frequency range. Further, upon applying the excitation voltage, the first set of conductors generates the electro-quasistatic (EQS) signals and the second set of conductors applies the electro-quasistatic (EQS) signals to the user's body, for transmitting the data packet from the wearable device to the at least one computing device via human-body communication (HBC). Furthermore, the processor is configured to trigger a feedback module associated with the wearable device to generate a notification in response to the successful transmission of the data packet to the at least one computing device.

In another aspect, the present disclosure relates to a method performed by a wearable device. The method includes generating, by a plurality of sensors, sensory data for transmission between a wearable device and at least one computing device associated with a user. The method includes generating, by a processor, a data packet for transmission to the at least one computing device of the user. The data packet is generated based at least on processing the sensory data captured by the plurality of sensors. Further, the method includes applying, by the processor, an excitation voltage between a first set of conductors and a second set of conductors for enabling at least the transmission of the data packet from the wearable device to the at least one computing device via electro-quasistatic (EQS) signals at a predefined frequency range. Upon applying the excitation voltage, the first set of conductors generates the electro-quasistatic (EQS) signals and the second set of conductors applies the electro-quasistatic (EQS) signals to the user's body, for transmitting the data packet from the wearable device to the at least one computing device via human-body communication (HBC). Furthermore, the method includes triggering, by the processor, a feedback module associated with the wearable device to generate a notification in response to the successful transmission of the data packet to the at least one computing device.

In another aspect, the present disclosure relates to a non-transitory computer-readable medium including processor-executable instructions that cause a processor to generate a data packet for transmission to the at least one computing device of the user. The data packet is generated based at least on pre-processing the sensory data captured by the plurality of sensors. The processor is caused to apply an excitation voltage between a first set of conductors and a second set of conductors for enabling at least the transmission of the data packet from the wearable device to the at least one computing device via electro-quasistatic (EQS) signals at a predefined frequency range. Upon applying the excitation voltage, the first set of conductors generates the electro-quasistatic (EQS) signals and the second set of conductors applies the electro-quasistatic (EQS) signals to the user's body for transmitting the data packet from the wearable device to the at least one computing device via human-body communication (HBC). Further, the processor is caused to trigger a feedback device associated with the wearable device to generate a notification in response to the successful transmission of the data packet to the at least one computing device.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers:

FIG. 12 illustrates a flow diagram of a method performed by the wearable device for enabling communication between the wearable device and the at least one computing device via the EQS signals, in accordance with an embodiment of the present disclosure.

Figure 1:
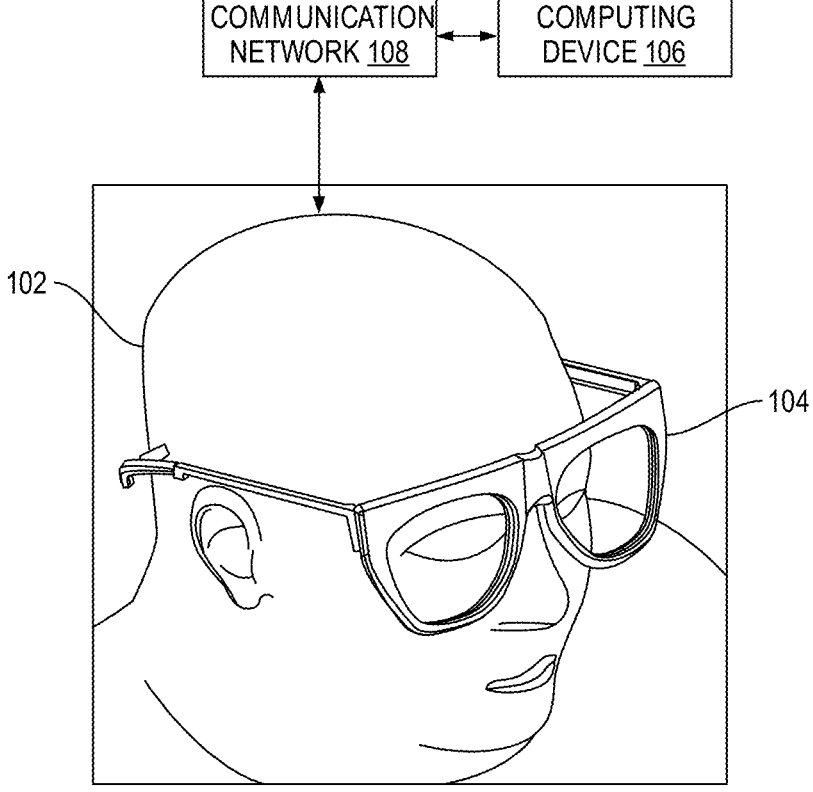
FIG. 1 illustrates an example representation of an environment for enabling communication between a wearable device and at least one computing device through an electro-quasistatic (EQS)—human-body communication (HBC) network, in accordance with an embodiment of the present disclosure.

The drawings referred to in this description are not to be understood as being drawn to scale except if specifically noted, and such drawings are only exemplary in nature.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration". Any embodiment or implementation of the present subject matter described herein as "exemplary" is not necessarily to be construed as preferred or advantageous over other embodiments. The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, addi-tional sub-modules. Appearances of the phrase "in an embodiment", "in another embodiment", "in an exemplary embodiment" and similar language throughout this specifi-cation may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting. A computer system (standalone, client, or server, or com-puter-implemented system) configured by an application may constitute a "module" (or "subsystem") that is config-ured and operated to perform certain operations. In one embodiment, the "module" or "subsystem" may be imple-mented mechanically or electronically, so a module includes dedicated circuitry or logic that is permanently configured (within a special-purpose processor) to perform certain operations. In another embodiment, a "module" or a "sub-system" may also comprise programmable logic or circuitry (as encompassed within a general-purpose processor or other programmable processor) that is temporarily config-ured by software to perform certain operations. Accordingly, the term "module" or "subsystem" should be understood to encompass a tangible entity, be that an entity that is physi-cally constructed permanently configured (hardwired), or temporarily configured (programmed) to operate in a certain manner and/or to perform certain operations described herein.

Referring now to the drawings, and more particularly to FIG. 1 through FIG. 13, where similar reference characters denote corresponding features consistently throughout the figures, there are shown preferred embodiments and these embodiments are described in the context of the following exemplary system and/or method.

FIG. 1 illustrates an example representation of an envi-ronment 100 related to at least some example embodiments of the present disclosure. Although the environment 100 is presented in one arrangement, other arrangements are also possible where the parts of the environment 100 (or other parts) are arranged or interconnected differently. The envi-ronment 100 includes a user 102, a wearable device 104, and at least one computing device 106. Some non-limiting examples of the computing device 106 may include a laptop computer, a smartphone, a desktop computer, a workstation terminal, a personal digital assistant, or in general, any computing device capable of communicating with the wear-able device 104.

The wearable device 104 is exemplarily depicted as an eyewear or eyeglasses. Some non-limiting examples of the wearable device 104 may include an augmented reality (AR) device, a virtual reality (VR) device, and a mixed reality (MR) device. Further, the wearable device 104 is uniquely designed to consolidate more processing power into a smaller unit. In other words, the wearable device 104 is designed to include a compact and lightweight design allow-ing the user 102 to use it with ease. The wearable device 104 includes a plurality of sensors (not shown). The plurality of sensors may include at least an imaging module, a micro-phone, biosensors, and the like. The plurality of sensors in the wearable device 104 may detect audio data, image data, video data, ambient parameters, and the like. The data (i.e., audio data, image data, video data, ambient parameters, and the like) generated by the plurality of sensors corresponds to a sensory data. In some example embodiments, the wearable device 104 may also include smartwatches, smart rings, AR/VR headsets, or any other form of wearable devices.

The wearable device 104 may include a processing mod-ule (not shown) for processing the sensory data generated by the plurality of sensors. Further, the processing module may transmit the processed sensory data to the at least one computing device 106 through a communication network 108. The communication network 108 may enable the transmission of sensory data between the wearable device 104 and the at least one computing device 106 through human-body communication (HBC) using electro-quasis-tatic (EQS) signals. In other words, the processing module of the wearable device 104 in communication around the user's 102 body couples the necessary electric fields around the body of the user 102 to achieve communication. In addition, the wearable device 104 may generate a notifica-tion that provides human feedback from any data received by the at least one computing device 106.

The number and arrangement of systems, devices, and/or networks shown in FIG. 1 are provided as an example. There may be other systems, devices, and/or networks; fewer systems, devices, and/or networks; different systems, devices, and/or networks, and/or differently arranged sys-tems, devices, and/or networks than those shown in FIG. 1.

Though few components and subsystems are disclosed in FIG. 1, there may be additional components and subsystems which is not shown, such as, but not limited to, ports, routers, repeaters, firewall devices, network devices, data-bases, network attached storage devices, user devices, addi-tional processing systems, servers, assets, machinery, instru-ments, facility equipment, any other devices, and combination thereof.

Those of ordinary skilled in the art will appreciate that the hardware depicted in FIG. 1 may vary for particular imple-mentations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Figure 2A:
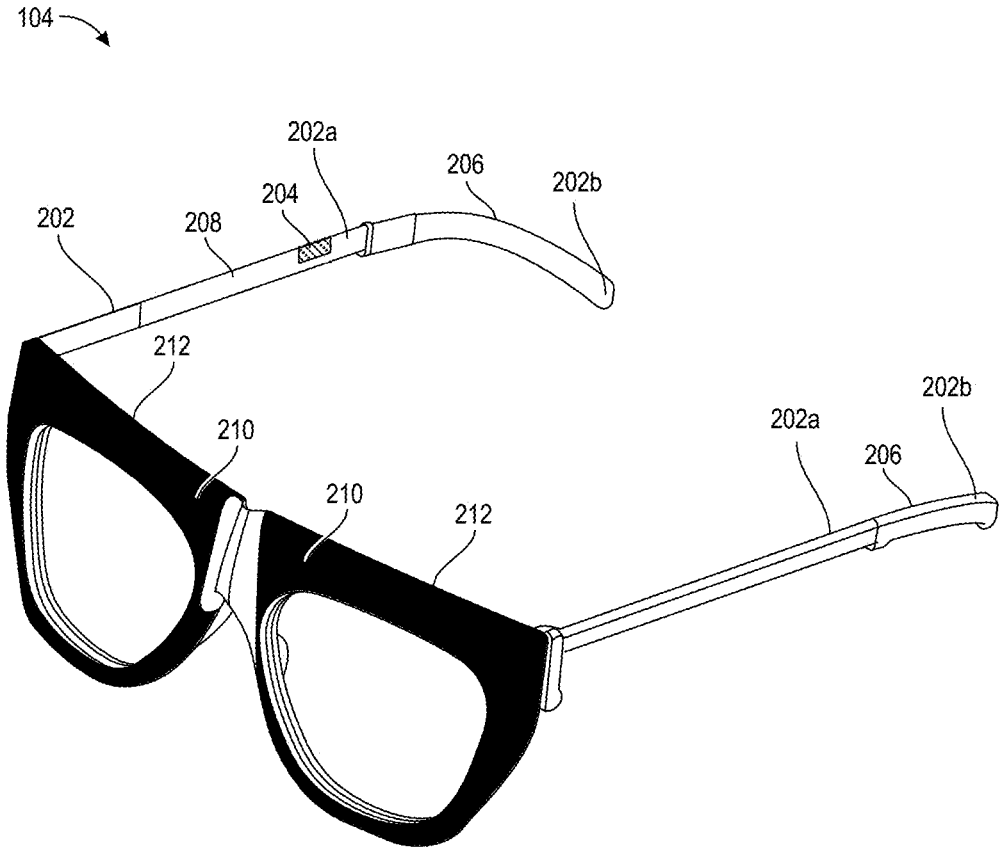
FIG. 2A illustrates a schematic representation of an exemplary wearable device, in accordance with an embodiment of the present disclosure.

FIG. 2A illustrates a schematic representation of the wearable device 104, in accordance with an embodiment of the present disclosure. As shown, the wearable device 104 may be an eyewear (e.g., augmented reality (AR) device or a SmartGlass). In general, the eyewear (or the wearable device 104) includes all the typical mechanical components of a typical eyewear including but not limited to a lens, rims, a connecting member, end-pieces, temple, temple tips, and bridge/nose pads.

Figure 2B:
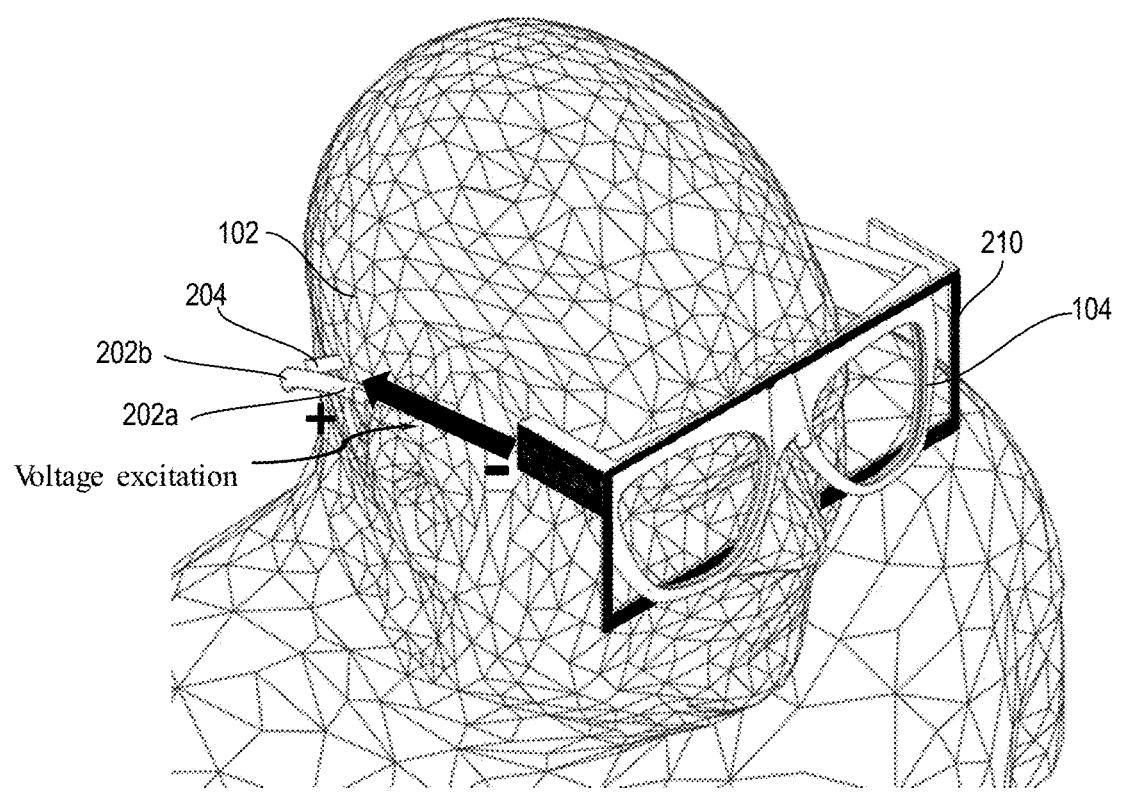
FIG. 2B illustrates a schematic representation of the exemplary wearable device worn by a user, in accordance with an embodiment of the present disclosure.

The wearable device 104 includes a plurality of sensors 202. The sensors 202 may include, such as for example, but not limited to, image sensors, at least one audio device, and one or more biosensors. Further, the wearable device 104 includes a first set of conductors 204. The first set of conductors 204 is mounted to at least a portion of a first support frame 206 of the wearable device 104. In particular, the first set of conductors 204 is mounted to an inner surface (see, 208 of FIG. 2A) of at least the portion of the first support frame 206. The first support frame 206 includes the temple and the temple tips of the wearable device 104 (or the eyewear). Thus, it is to be noted that the first set of conductors 204 is mounted to the inner surface 208 of at least the portion of the temple and/or the temple tips of the wearable device 104. Further, the first set of conductors 204 mounted to the inner surface 208 of at least the portion of the first support frame 206 and is in contact with at least a head anatomy of the user 102 during the operation of the wearable device 104 (i.e., when the wearable device 104 is worn by the user 102 as shown in FIG. 2B). In other words, the first set of conductors 204 mounted on the temple tip and temple of the eyewear (or the wearable device 104) is in direct contact with the side of the head on one or both sides (as shown in FIG. 2B). The first set of conductors 204 corresponds to signal conductors configured to facilitate data transmission. It should be understood that a signal conductor is affixed to the human head with a small contact to the user's 102 body, and a cuboid ground plane (i.e., the first set of conductors 204) is modeled atop the computer-aided designed glasses surface (i.e., the wearable device 104).

In an embodiment, the first set of conductors 204 possess an area of at least 5 mm by 1 cm, with 5 mm by 5 mm in contact with the body of the user 102, to achieve optimal signal coupling. In other words, the wearable device 104 including the first set of conductors 204 smaller than 5 mm by 5 mm in contact area and 5 mm by 1 cm in total area operates under suboptimal EQS field coupling modes for the purpose of communication around the users' 102 body.

The first set of conductors 204 is configured with a slender profile of a predetermined width range relative to the dimensions of the wearable device 104 to at least maintain a maximum signal coupling for data transmission and to achieve a variable form factor of the wearable device 104. The slender profile of the first set of conductors 204 refers to the thin and narrow design of the first set of conductors 204. Further, the form factor of the wearable device 104 refers to the physical dimensions, shape, and design characteristics of the wearable device 104.

Further, the first set of conductors 204 designed with the slender profile results in a surface area with negligible width relative to the dimensions of the eyeglass (or the wearable device 104). This design choice results in a minimized form factor for the wearable device 104. Specifically, the width of the first set of conductors 204 is independent of the magnitude of the signal levels. Additionally, the first set of conductors 204 may be configured with variable width, deviating from the requirement of thinness relative to the dimensions of the wearable device 104. This adaptation, while diverging from the thin conductor configuration, maintains equivalent operational functionality in the wearable device 104. This configuration facilitates an increased form factor of the wearable device 104.

In an embodiment, the first set of conductors 204 may be mounted to one or more components of the wearable device 104 and uses sufficient and high area to achieve the low loss of body communication signals. The one or more components of the wearable device 104 may be an eyeglass lens, rims, bridge, nose pads, end pieces, hinges, or anywhere on the wearable device 104. The mounting of the first set of conductors 204 enables effective EQS field interaction for enhanced body communication and minimizes loss of body communicated signals.

Further, the wearable device 104 includes a second set of conductors 210. The second set of conductors 210 is mounted to at least a portion of a second support frame 212 of the wearable device 104. The second set of conductors 210 is positioned in proximity to the user's 102 body during the operation of the wearable device 104. The second support frame 212 includes at least a connecting member (such as a bridge member), a mounting means (such as rims and hinges), and a set of support structures (such as nose pads). As shown, the second set of conductors 210 spans the entirety of the eyeglass/eyewear structure (i.e., the wearable device 104) from one hinge to the other to create the maximum EQS fields on and around the user 102.

The second set of conductors 210 corresponds to a floating ground or a reference electrode. The second set of conductors 210 is configured to effectively apply the EQS signals onto the human body (i.e., the user 102) or capture the EQS signals from the human body (i.e., the user 102) for the purposes of electronic communication. In particular, the second set of conductors 210 mounted to at least the portion of the connecting member, the mounting means, the set of support structures of the second support frame 212 is positioned in proximity to the user's 102 body by a predefined distance during the operation of the wearable device 104. The second set of conductors 210 positioned in proximity to the user 102 by the predefined distance during the operation of the wearable device 104 operates in a non-contact mode for enabling communication between the wearable device 104 and the at least one computing device 104.

In particular, the second set of conductors 210 positioned by the predefined distance away from the user 102 during the operation of the wearable device 104 (i.e., when the wearable device 104 is worn by the user 102) facilitates the transfer of the electro-quasistatic (EQS) signals on and around the user's 102 body and minimizing channel loss during the communication. The second set of conductors 210 positioned at the predefined distance from the user 102 for enabling the data transmission (or EQS signals) around the user 102 corresponds to a sub-optimal mode of operation of the wearable device 104. In other words, the second set of conductors 210 is positioned maximally away from the user 102 to create the maximum amount of EQS field on and around the user 102 in the sub-optimal mode. The second set of conductors 210, distinct from the user's 102 body, are thoughtfully arranged to minimize signal attenuation and facilitate the effective coupling of the electro-quasistatic (EQS) signals from the body. This placement serves to maximize the EQS field generation and pickup on and around the user's 102 body, bolstering communication signal-to-noise ratio.

In an embodiment, in the non-contact mode of operation for the second set of conductors 210, the conductor span of the second set of conductors 210 may be reduced around the nose pad/bridge/center of the wearable device 104 to maintain a significant distance between the second set of conductors 210 and the user 102 to maximally excite EQS fields. In one embodiment, in the non-contact mode, the second set of conductors 210 may be configured in the entirety of the rims of the wearable device 104, including the area beneath the eyes.

In another embodiment, the location of the second set of conductors 210 spans the entirety of the wearable device 104 structure from one hinge to the other to create maximum EQS fields on and around the user's 102 body.

In another embodiment, a conductor span of the second set of conductors 210 on the temple (i.e. the first support frame 202) may be reduced at the locations (for example, locations 202a of the first support frame 202) of the mount close to the user 102 (as shown in FIG. 2B). Further, the second set of conductors 210 at the hinge may be potentially scaled thinner as it approaches the mounting point (for example, locations 202b of the first support frame 202)

toward the temple tip to obtain maximum EQS fields for the purpose of body communication.

Figure 2C:
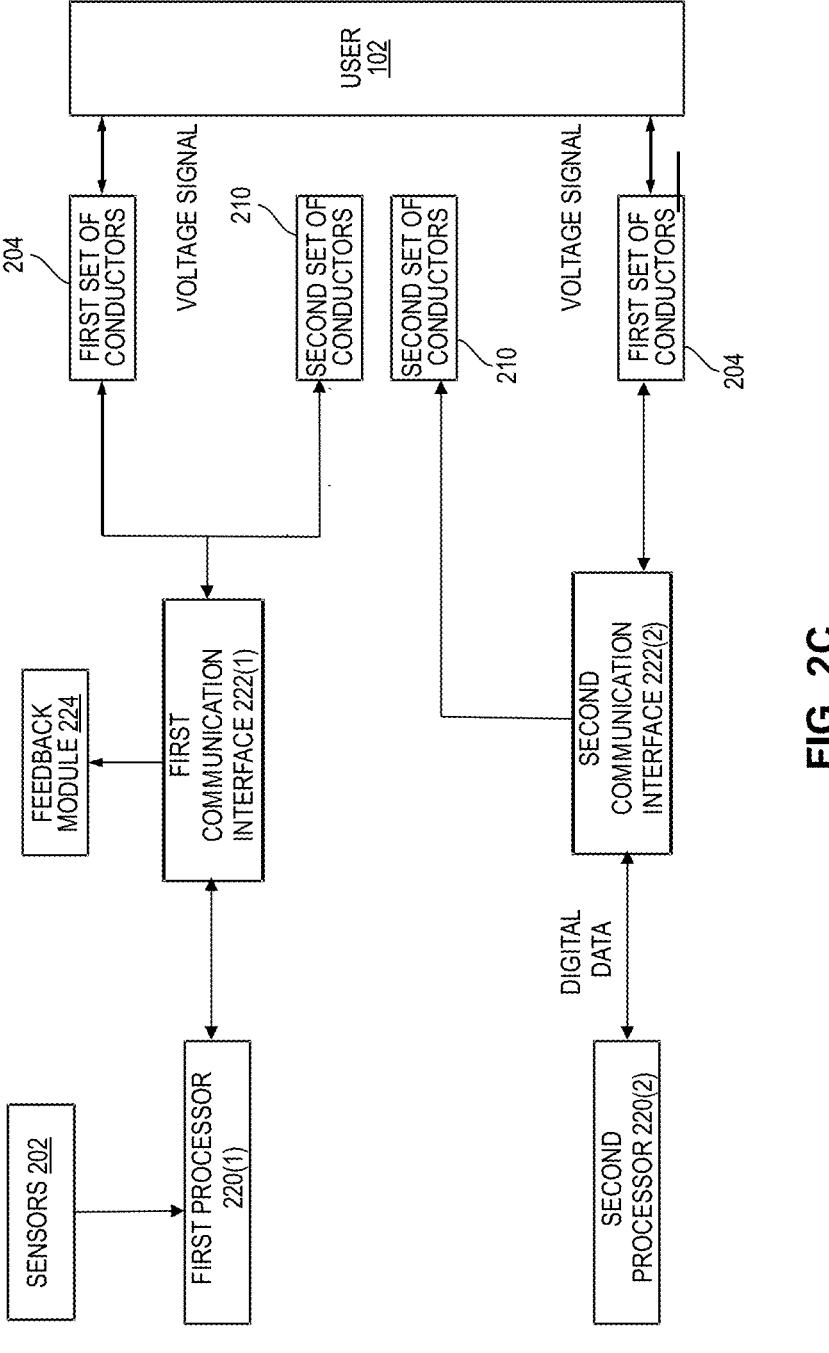
FIG. 2C illustrates a block diagram representation depicting data transmission between the exemplary wearable device and the at least one computing device, in accordance with an embodiment of the present disclosure.

FIG. 2C illustrates a block diagram representation depicting data transmission between the wearable device 104 and the at least one computing device 106, in accordance with an embodiment of the present disclosure. The wearable device 104 includes a first processor 220(1). The first processor 220(1) corresponds to a processor of the wearable device 104. The first processor 220(1) is communicably coupled to the plurality of sensors 202, the first set of conductors 204, and the second set of conductors 210 via a first communication interface 222(1). The first processor 220(1) is configured to generate a data packet for transmission to the at least one computing device 106 via the user 102. The data packet is generated based at least on processing the sensory data captured by the plurality of sensors 202. For example, the sensory data may include an audio-visual data or a video stream data or a textual data, a gesture data, or the like. The processing operations performed by the first processor 220(1) may be, but not limited to, compression, and noise removal, of the sensory data for transmission to the at least one computing device 106. Then, the wearable device 104 utilizes EQS-HBC to communicate the data packet as explained above. Further, the at least one computing device 106 includes a second processor 220(2) and a second communication interface 222(2) communicably coupled to the first set of conductors 204, the second set of conductors 210. The second processor 220(2) is configured to process the data received from the wearable device 104 via the second communication interface 222(2). The processing of the data from the wearable device 104 is performed at the computing device 106 (i.e., the second processor 220(2)). As the data processing of the wearable device 104 is performed at the computing device 106, the wearable device 104 requires significantly lower power.

In particular, an excitation voltage may be applied between the first set of conductors 204 and the second set of conductors 210 for enabling at least the transmission of the data packet from the wearable device 104 to the at least one computing device 106 via electro-quasistatic (EQS) signals at a predefined frequency range. Upon applying the excitation voltage, the first set of conductors 204 generates the electro-quasistatic (EQS) signals and the second set of conductors 210 facilitates transmission of the electro-quasistatic (EQS) signals to the user's 102 body. This enables human-body communication (HBC) for transmission of the data packet between the wearable device 104 and the at least one computing device 106. The first set of conductors 204 mounted to the inner surface 208 of the first support frame 206 enables at least one first position vector associated with the first set of conductors 204 to be oriented towards the user's 102 body. This allows contact between the first set of conductors 204 and the user's 102 body for enabling human-body communication (HBC) via the electro-quasistatic (EQS) signals. Furthermore, the second set of conductors 210 mounted to the second support frame 212 enables at least one second position vector associated with the second set of conductors 210 to be oriented away from the user's 102 body and operate in a sub-optimal mode. This enables maximizing the transfer of the electro-quasistatic (EQS) signals to enable the human-body communication (HBC). Further, the predefined frequency range is about, for example, but not limited to, 0.1 MHz to 100 MHz or more. The first position vectors and the second position vectors typically refer to the vector specifying the location of a point or segment of the conductor (i.e., the first set of conductors 204 and the second set of conductors 210) in space. The first position vectors and the second position vectors define the geometry of the first set of conductors 204 and the second set of conductors 210, respectively, when analyzing electric and magnetic fields, and currents.

In an embodiment, the first set of conductors 204 mounted to the one or more components of the wearable device 104 is positioned in proximity to the user's 102 body. This enables a sub-optimal body communication through the electro-quasistatic (EQS) signals. The first set of conductors 204, through any means of contact or proximity, is positioned adjacent to the user 102 during the operation of the wearable device 104 in the sub-optimal body communication mode enhances the efficiency of the communication process. Due to the techniques and technical edge provided by the present invention, the wearable device 104 operates with a significantly lower power consumption. This result is due to the offloading of the sensory data and processing of the sensory data performed elsewhere (such as in the computing device 106) on the user's 102 body.

In an embodiment, the second set of conductors 210 mounted to at least the portion of the second support frame 212 is operated in contact mode with the user's 102 body during the operation of the wearable device 104. The second set of conductors 210 operating in the contact mode with the user's 102 body triggers galvanic-based electro-quasistatic (EQS) signal communication. The direct contact between the second set of conductors 210 and the user's 102 body utilizing EQS fields for communication, yields localized field intensity around the excitation point (i.e., the location 202a where the first set of conductors 204 is in contact with the user 102).

It is known that water filled with conductive particles such as electrolytes and salts conducts electricity better. The human body is filled with a watery solution called the interstitial fluid that sits underneath the skin and around the cells of the body. The interstitial fluid is responsible for carrying nutrients from the bloodstream to the body's cells and is filled with proteins, salts, sugars, hormones, neurotransmitters, and all sorts of other molecules that help keep the body going. As a result, the interstitial fluid in the user's body (i.e., the user 102) allows the establishment of a circuit between two or more communicating devices (the computing device 106 and the wearable device 104) located anywhere on the body. Hence, the user's body (i.e. the user 102) may be referred to as a human body communication (HBC) system. Thus, for enabling data transmission using the body communicated signals, the human body communication system may include a transmitting electrode (i.e., the first set of conductors 204) and a receiving electrode (i.e., the second set of conductors 210). It is apparent that there is no common ground, or no closed path for current to flow. However, the closed path is formed using parasitic capacitances from the computing device 106 and the wearable device 104 to the earth's ground. The parasitic capacitances may be referred to as the capacitive HBC. The formation of the parasitic capacitances forms a closed circuit, thus enabling data transmission between the computing device 106 and the wearable device 104 through the low-resistance tissue layers inside the body.

In addition, the first processor 220(1) triggers a feedback module 224 associated with the wearable device 104 to generate a notification in response to the successful transmission of the data packet to the at least one computing device 106. For example, the wearable device 104 may include audio or video feedback or some sort of indication or output that provides human feedback from any data received by the at least one computing device 106 after artificial intelligence (AI) or computer vision processing. The feedback module 224 may include a display interface, a speaker, and the like.

Figure 3:
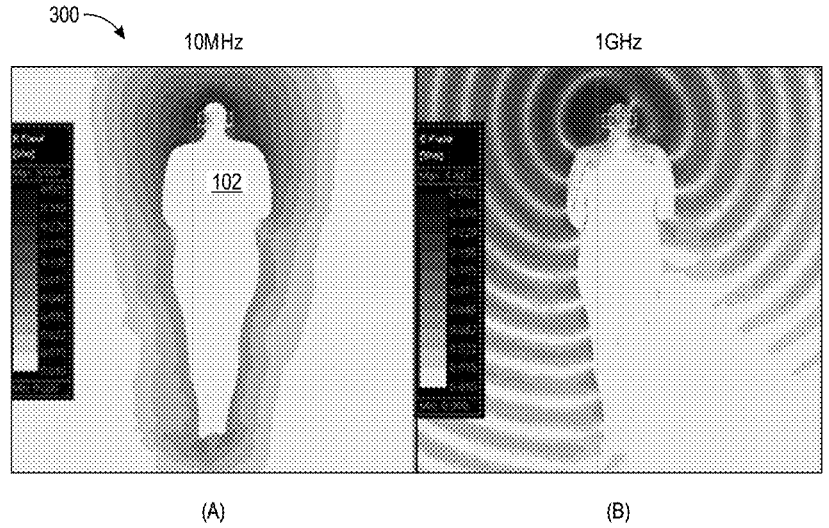
FIG. 3 illustrates an exemplary simulation result depicting the difference between conventional high-speed electromagnetic (EM) radio frequency (RF) communication versus the EQS-HBC communication technology implemented by the wearable device, in accordance with an embodiment of the present disclosure.

FIG. 3 illustrates a simulation result 300 depicting the difference between conventional high-speed EM RF communication versus the EQS-HBC communication technology implemented by the wearable device 104, in accordance with an embodiment of the present disclosure. The key innovation to reducing power consumption and improving security is to reduce the frequency of operation and hence confine the signals to a very narrow area around the human body (as shown in a) at 10 MHz). It is evident from the electric field plot comparing the EM RF based simulation (1 GHz) to the EQS-HBC based excitation (10 MHz) that the EQS-HBC excitation confines the signal and hence energy locally to the user's 102 body. More specifically, the reduction of the frequency enables the entire body of the user 102 to be at the same potential and allows for some key simplifying properties in the physical design.

Figure 4:
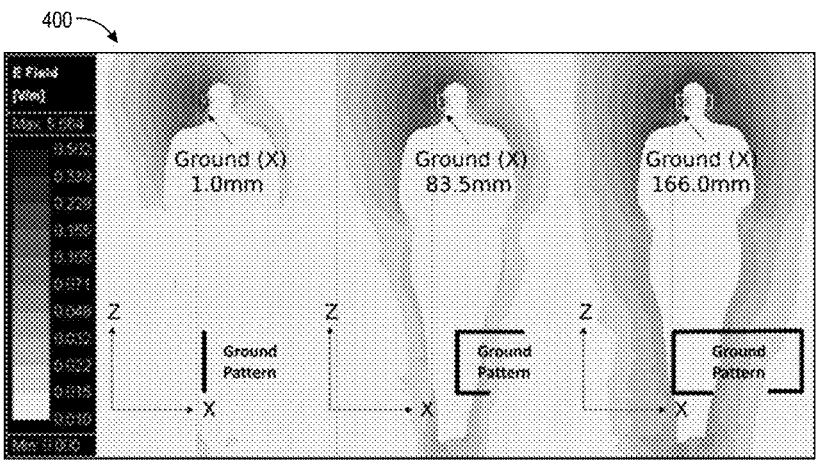
FIG. 4 illustrates a simulation result depicting the progression of increased electric field levels due to the expansion of a second set of conductors across the head of a user, in accordance with an embodiment of the present disclosure.

FIG. 4 illustrates a simulation result 400 depicting the progression of increased electric field levels due to the expansion of the second set of conductors 210 across the head of the user 102 (ear to ear), in accordance with an embodiment of the present disclosure. The physical geometry design portion of the wearable device 100 that utilizes EQS-HBC is shown in FIG. 4. As shown, the ground plane extends in the x-direction, and the electric field around the user's body (i.e., the user 102) increases in magnitude. The x-direction may be the direction of a position vector pointing from one eye to the other on the human body (i.e., the user 102). As shown, three ground sizes in the x-direction are used as a comparison. In one example, the lighter portion of the electric field plot signifies a higher electric field (as shown in FIG. 4). With an X-direction reference/ground size of only 1 mm, the fields are localized mostly to the top portion of the human body (i.e., the user 102). As the second set of conductors 210 spans the entire left rim of the wearable device 104, the fields expand to encompass the whole body of the user 102, but at a relatively lower amplitude (as shown in FIG. 4). It is to be noted that when the second set of conductors 210 reaches past the head of the user 102 on the other side, the field intensity may increase.

Figure 5:
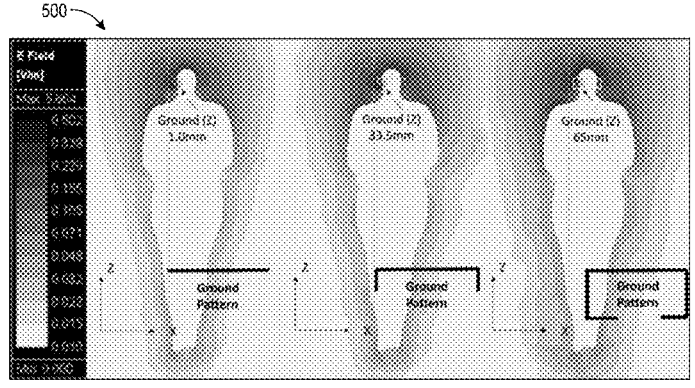
FIG. 5 represents a simulation result depicting a progression of the increased electric field levels due to the expansion of the second set of conductors along the direction from head to neck along and along the bottom rims of the wearable device, in accordance with an embodiment of the present disclosure.

FIG. 5 represents a simulation result 500 depicting a progression of the increased electric field levels due to expansion of the second set of conductors 210 along the direction from head to neck along and along the bottom rims of the wearable device 104, in accordance with an embodiment of the present disclosure. As the second set of conductors 210 spans in the z-direction around the rims (represented by a position vector that points from the chin to the eyes of the user 102), the electric field intensity also increases.

Figure 6:
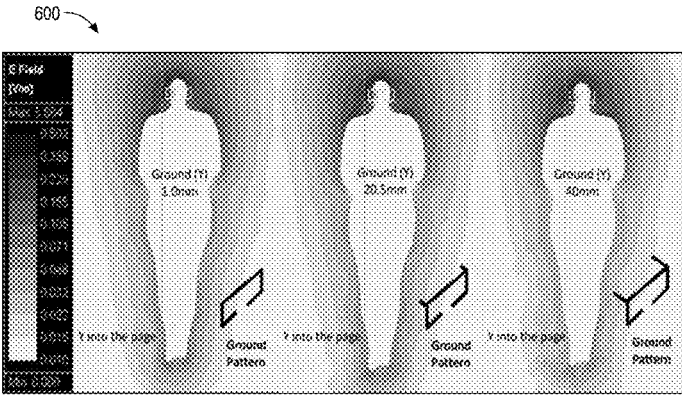
FIG. 6 represents a simulation result depicting a final dimension in the physical/geometrical design of the second set of conductors of the wearable device implementing EQS-HBC, in accordance with an embodiment of the present disclosure.

FIG. 6 represents a simulation result 600 depicting a final dimension in the physical/geometrical design of the second set of conductors 210 of the wearable device 104 implementing EQS-HBC, in accordance with an embodiment of the present disclosure. The second set of conductors 210 spans in the y-direction along the temple of the wearable device 104 direction (defined by face to back of head). In this example, a non-significant effect may be observed from 0 to 20 mm, and a reduction in electric field intensity around the body (i.e., the user 102) may be observed as the span increases beyond 40 mm. This is due to the fact the second set of conductors 210 is increasing closer to the signal plane (i.e., the first set of conductors 204 in combination with the human body (i.e., the user 102) forms the signal plane). The decrease in the field intensity depends on at least the shape of the human head and the second set of conductors 210 spans relative to the user 102.

Figures 7, 8:
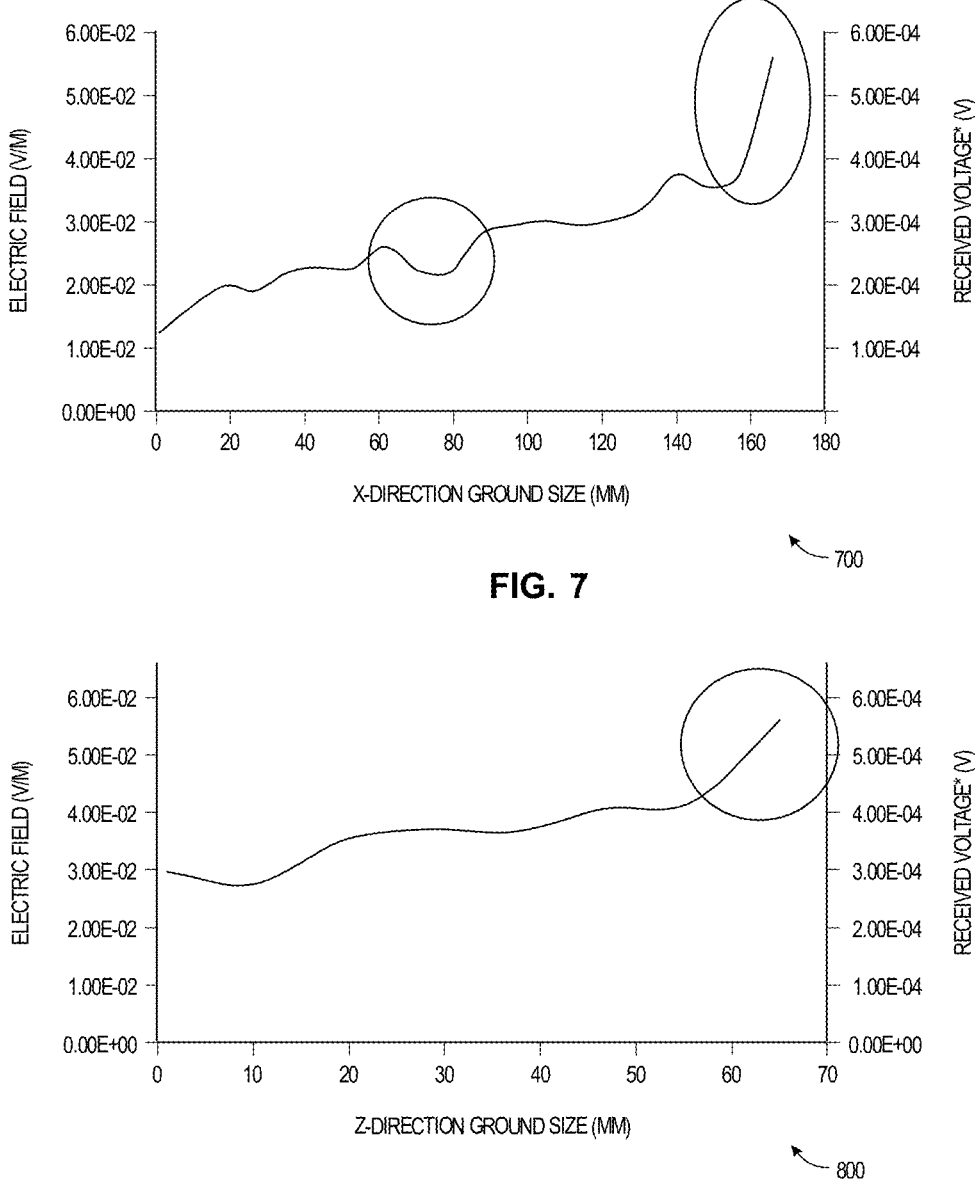
FIG. 7 is a graphical representation depicting a x-direction physical quantities of the electric field and received voltage of a receiver, in accordance with an embodiment of the present disclosure.
FIG. 8 is a graphical representation depicting the electric field and the received voltage (potential difference) for a prototypical receiver around the user (from forehead to neck direction), in accordance with an embodiment of the present disclosure.

FIG. 7 is a graphical representation 700 depicting the x-direction physical quantities of electric field and received voltage of a receiver, in accordance with an embodiment of the present disclosure. The x-direction physical quantities of the electric field and received voltage of a receiver in the graphical representation 700 are plotted assuming a 1 cm effective receiver length to give a quantitative measure. The sharp increase in an electric field is depicted in the circled highlighted portion (160 mm+ which is past the human head) (as shown in FIG. 7).

FIG. 8 is a graphical representation 800 depicting the electric field and the received voltage (potential difference) for a prototypical receiver around the user 102 (from forehead to neck direction), in accordance with an embodiment of the present disclosure. It should be understood that the result obtained by adding the second set of conductors 210 on the bottom rim of the wearable device 104 shows the moderately improving voltage and electric field value as the amount of ground near the hinges of the wearable device 104 that extends down toward the cheek. The main boost in slope toward the end is due to the extension of the second set of conductors 210 along the bottom rim of the wearable device 104.

Figure 9:
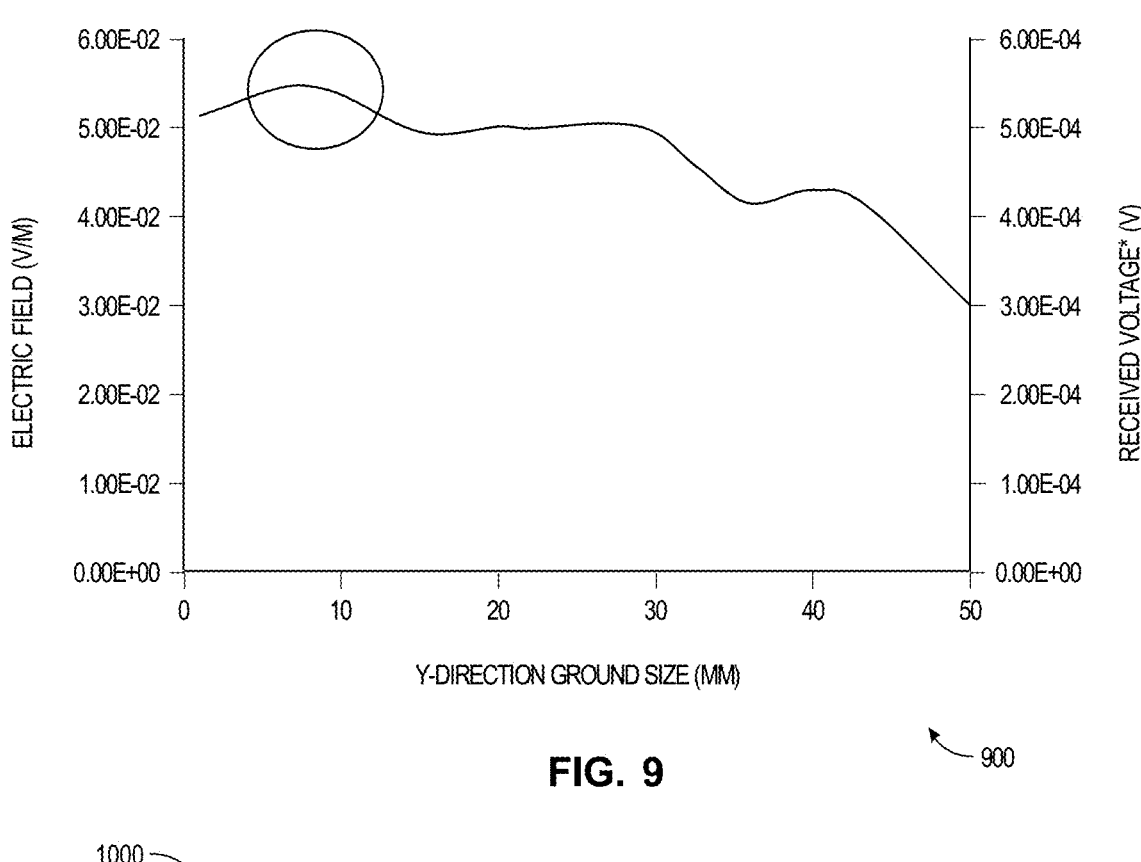
FIG. 9 is a graphical representation depicting the electric field and received voltage for a prototypical receiver around the user, in accordance with an embodiment of the present disclosure.

FIG. 9 is a graphical representation 900 depicting the electric field and received voltage for a prototypical receiver around the user 102, in accordance with an embodiment of the present disclosure. The graphical representation 900 depicting the electric field and received voltage for the prototypical receiver around the user 102 is plotted based on a factor that the size of the second set of conductors 210 increases along the temple direction of the wearable device 104. The graphical representation 900 depicts a significant detriment to have the second set of conductors 210 exceed about 10 mm.

Figure 10:
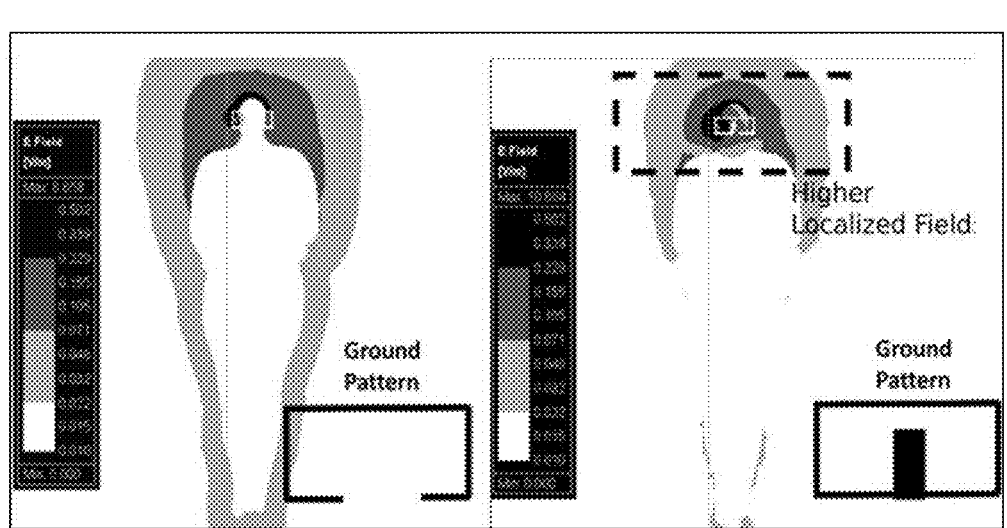
FIG. 10 is a simulation result depicting the electric field around the user for the wearable device including the second of conductors when disposed and not being disposed on the nose pad and bridge of the wearable device, in accordance with an embodiment of the present disclosure.

FIG. 10 is a simulation result 1000 depicting the electric field around the user 102 for the wearable device 104 including the second of conductors 210 when disposed and not being disposed on the nose pad and bridge of the wearable device 104, in accordance with an embodiment of the present disclosure. As the nose pad and bridge of the wearable device 104 are very close and border on touching with the user 102, the galvanic communication is enabled instead of capacitive communication. In this scenario, the channel loss is significantly higher for distances far away, but immensely lower in the extremely localized environment due to high intensity fields resulting from high localized currents. In other words, the channel is feasible for ultrashort-distance communication but suffers for long distances.

In one example, for applications involving front-to-back head communication or significantly localized fields for applications including but not limited to smart contact lenses, necklaces, etc., a cutout of the second set of conductors 210 may exist around the nose-pad and bridge and lower rims that meet the human body (or the user 102) when the wearable device 104 is worn by the user 102.

Figure 11:
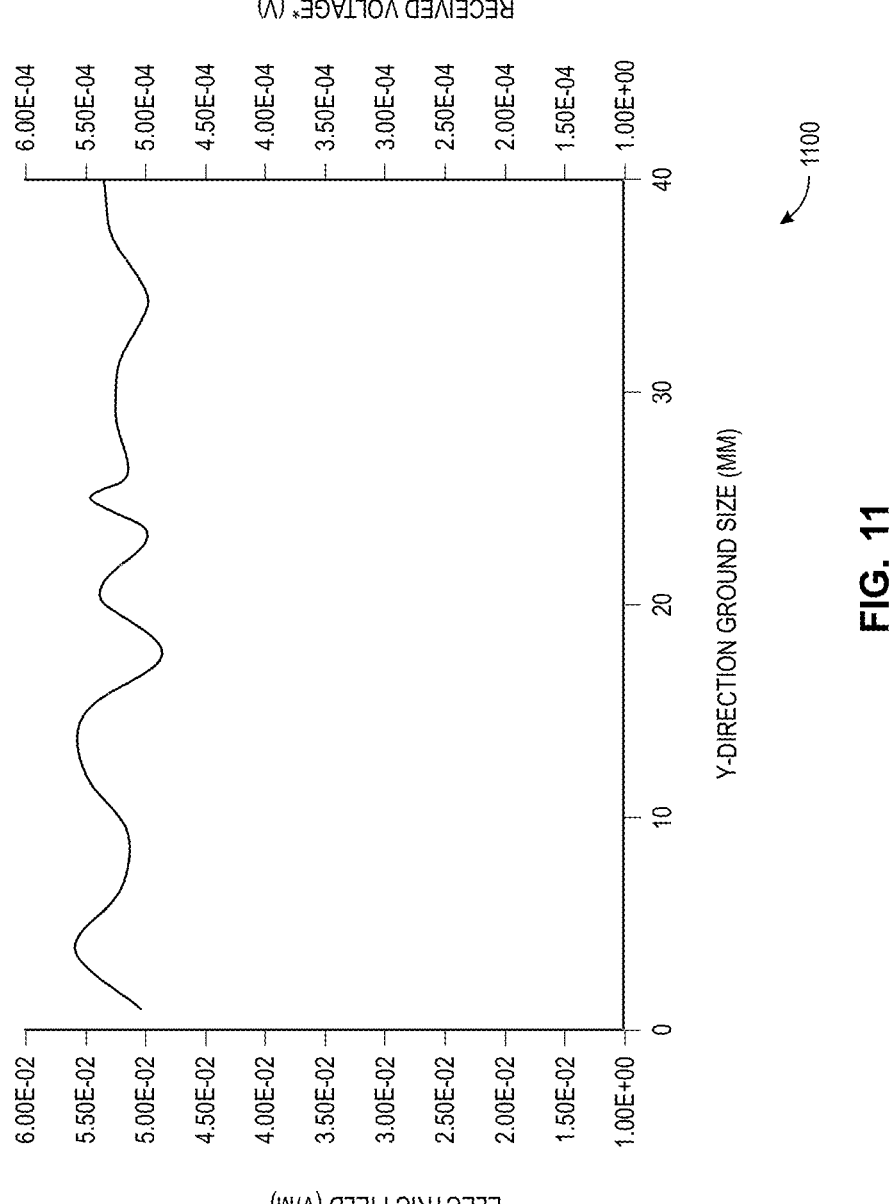
FIG. 11 is a graphical representation depicting the electric field and receive voltage for a prototypical receiver around the user as the size of a first set of conductors is varied near the temple tips or rear of the temple of the wearable device, in accordance with an embodiment of the present disclosure.

FIG. 11 is a graphical representation 1100 depicting the electric field and receive voltage for a prototypical receiver around the user 102 as the size of the first set of conductors 204 is varied near the temple tips or rear of the temple (as shown in 202b of FIG. 2A) of the wearable device 104, in accordance with an embodiment of the present disclosure. From the graphical representation 1100, it is apparent that the most optimal configuration involves a minimum contact area between the first set of conductors 204 and the human body (the user 102). The present invention incorporates the uses of EQS-HBC in both capacitive and galvanic forms as explained above.

FIG. 12 illustrates a flow diagram of a method 1200 performed by a wearable device 104 for enabling communication between the wearable device 104 and the at least one computing device 106 via the EQS signals, in accordance with an embodiment of the present disclosure. The method 1200 starts at step 1202.

At step 1202, the method 1200 includes generating, by the plurality of sensors 202, the sensory data for transmission between the wearable device 104 and the at least one computing device 106 associated with the user 102.

At step 1204, the method 1200 includes generating the data packet for transmission to the at least one computing device 106 of the user 102. The data packet is generated based at least on processing the sensory data captured by the plurality of sensors 202.

At step 1206, the method 600 includes applying the excitation voltage between the first set of conductors 204 and the second set of conductors 210 for enabling at least the transmission of the data packet from the wearable device 104 to the at least one computing device 106 via electroquasistatic (EQS) signals at the predefined frequency range. Further, upon applying the excitation voltage, the first set of conductors 204 generates the electro-quasistatic (EQS) signals and the second set of conductors 210 applies the electro-quasistatic (EQS) signals to the user's 102 body. This enables human-body communication (HBC) for transmission of the data packet between the wearable device 104 and the at least one computing device 106.

At step 1208, the method 1200 includes triggering the feedback module 224 associated with the wearable device 104 to generate a notification in response to the successful transmission of the data packet to the at least one computing device 106. The one or more operations performed by the wearable device 104 are already explained with references to FIG. 1 to FIG. 11, and therefore they are not reiterated, for the sake of brevity.

Figure 13:
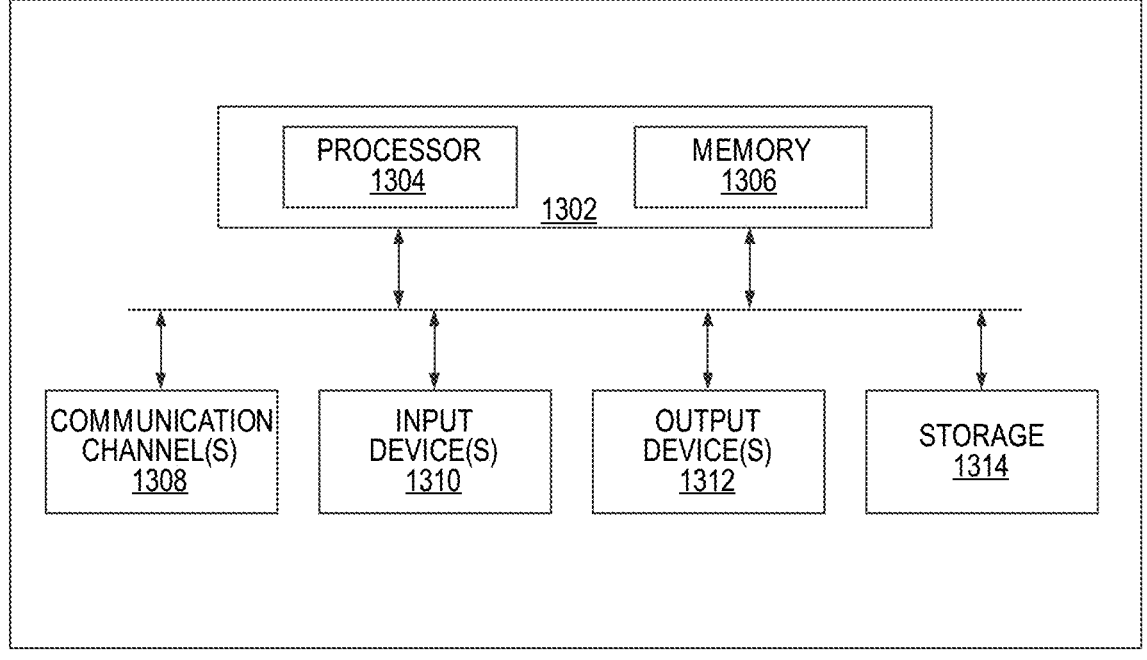
FIG. 13 illustrates a simplified block diagram representation of an electronic device, in accordance with an embodiment of the present disclosure.

FIG. 13 illustrates a simplified block diagram representation of an electronic device 1300, in accordance with an embodiment of the present disclosure. The electronic device 1300 is the example of the computing device 106 and the wearable device 104. The electronic device 1300 includes a computer system 1302. The computer system 1302 includes one or more processors 1304 and at least one memory 1306. The processor 1304 is configured to execute program instructions. For example, the processor 1304 may be a real processor or a virtual processor. It will be understood that the computer system 1302 does not suggest any limitation as to the scope of use or functionality of the described embodiments. The computer system 1302 may include, but is not limited to, one or more of a general-purpose computer, a programmed microprocessor, a microcontroller, an integrated circuit, digital signal processors (DSPs), field-programmable gate arrays (FPGAs), and application-specific integrated circuits (ASICs) and other devices or arrangements of devices that are capable of implementing the steps that constitute the methods of the present invention.

Exemplary embodiments of the computer system 1302 in accordance with the present invention may include one or more servers, desktops, laptops, tablets, smartphones, mobile phones, mobile communication devices, tablets, phablets, and personal digital assistants. In an embodiment, the memory 1306 may store software for implementing various embodiments of the present invention. The computer system 1302 may include additional components or fewer components. For example, the computer system 1302 may include one or more communication channels 1308, one or more input devices 1310, one or more output devices 1312, and a storage 1314. An interconnection mechanism (not shown) such as a bus, control circuitry, or network, interconnects the components of the computer system 1302. In various embodiments, operating system software (not shown) provides an operating environment for various software(s) executing in the computer system 1302 using a processor 1304 and manages different functions and features of the components of the computer system 1302.

The communication channel(s) 1308 allows communication over a communication medium to various other computing entities. The communication medium provides information such as program instructions, or other data in a communication medium. The communication media may include, but are not limited to, wired or wireless methodologies implemented with electrical, optical, RF, infrared, acoustic, microwave, Bluetooth, IEEE 802.15.6, IEEE 802.15.4, IEEE 802.15.3 compliant networking protocols, or other transmission media.

The input device(s) 1310 may include, but are not limited to, a touch screen, a keyboard, mouse, pen, joystick, trackball, a voice device, a scanning device, or any other device that is capable of providing input to the computer system 1302. In an embodiment of the present invention, the input device(s) 1310 may be a sound card or similar device that accepts audio input in analog or digital form. The output device(s) 1312 may include, but not be limited to, a user interface on CRT, LCD, LED display, or any other display associated with any of servers, desktops, laptops, tablets, smartphones, mobile phones, mobile communication devices, tablets, phablets and personal digital assistants, printer, speaker, CD/DVD writer, or any other device that provides output from the computer system 1302.

The storage 1314 may include, but not be limited to, magnetic disks, magnetic tapes, CD-ROMs, CD-RWs, DVDs, any types of computer memory, magnetic stripes, smart cards, printed barcodes, or any other transitory or non-transitory medium that may be used to store information and can be accessed by the computer system 1302. In various embodiments, the storage 1314 may contain program instructions for implementing any of the described embodiments.

In an embodiment, the computer system 1302 is part of a distributed network or a part of a set of available cloud resources.

In an embodiment, the present invention may be applicable to any such wearable compute apparatus, including a plurality of sensors, but whose processing power is in a separate computing device near the device in a body area network. To further illustrate, the utility advantage of this implementation is that the wearable device becomes as lightweight as it does.

Further, The invention pertains to the field of augmented reality smart glasses, specifically focusing on wearable device (for example, electronic eyewear) utilizing electroquasistatic human body communication (EQS-HBC). Conventional wireless methods, such as radio frequency (RF) electromagnetic radiation, face limitations in security, power consumption, and form factor when applied to smart glasses. The wearable device of the present invention overcomes these challenges by employing EQS-HBC, a low-power, near-field communication technique. In addition, the present invention provides the wearable device with various geometric considerations for minimizing signal loss. Further, the present invention provides an optimal design of the wearable device enabled by EQS-HBC communication techniques. The proposed EQS-HBC wearable device addresses the shortcomings of existing communication modules, providing a breakthrough in power efficiency, security, and form factor for augmented reality wearable devices via distributed computing.

The present invention may be implemented in numerous ways including as a system, a method, or a computer program product such as a computer readable storage medium or a computer network wherein programming instructions are communicated from a remote location.

In some aspects, the present invention may suitably be embodied as a computer program product for use with the computer system 1302. The method described herein is typically implemented as a computer program product, comprising a set of program instructions that is executed by the computer system 1302 or any other similar device. The set of program instructions may be a series of computer-readable codes stored on a tangible medium, such as a computer-readable storage medium (i.e., the storage 1314), for example, diskette, CD-ROM, ROM, flash drives or hard disk, or transmittable to the computer system 1302, via a modem or other interface device, over either a tangible medium, including but not limited to the optical or analog communications channel(s) 1308. The implementation of the invention as a computer program product may be in an intangible form using wireless techniques, including but not limited to microwave, infrared, Bluetooth, or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Although a preferred embodiment of the present invention has been described for illustrative purposes, those skilled in the art will appreciate that various modifications, additions and substitutions are possible, without departing from the scope and spirit of the invention as disclosed in the accompanying claims. Such alterations are herewith anticipated.

One of the ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, a. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a", "an", and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limited, of the scope of the invention, which is outlined in the following claims.

What is claimed is:

1. A wearable device, comprising:

a plurality of sensors configured to generate sensory data for transmission to at least one computing device associated with a user;

a first set of conductors mounted to at least a portion of a first support frame of the wearable device, wherein the first set of conductors is in contact with a portion of a user's body during the operation of the wearable device;

wherein the first set of conductors is mounted to an inner surface of at least the portion of the first support frame and is in contact with at least a head anatomy of the user during the operation of the wearable device, and wherein the first set of conductors mounted to an inner surface enables at least one first position vector associated with the first set of conductors to be oriented towards the user's body, and wherein the at least one first position vector associated with the first set of conductors enables human-body communication (HBC) by applying the electro-quasistatic (EQS) signals to the user's body;

a second set of conductors mounted to at least a portion of a second support frame of the wearable device, wherein the second set of conductors is positioned in proximity to the user's body during the operation of the wearable device; and a processor communicably coupled to the plurality of sensors, the first set of conductors, and the second set of conductors, the processor configured to at least:

generate a data packet for transmission to the at least one computing device of the user, wherein the data packet is generated based at least on processing the sensory data captured by the plurality of sensors, apply an excitation voltage between the first set of conductors and the second set of conductors for enabling at least the transmission of the data packet from the wearable device to the at least one computing device via electro-quasistatic (EQS) signals at a predefined frequency range, wherein, upon applying the excitation voltage, the first set of conductors generates the electro-quasistatic (EQS) signals and the second set of conductors applies the electro-quasistatic (EQS) signals to the user's body, for transmitting the data packet from the wearable device to the at least one computing device via human-body communication (HBC), and trigger a feedback module associated with the wearable device to generate a notification in response to the successful transmission of the data packet to the at least one computing device.

2. The wearable device of claim 1, wherein the first set of conductors is configured with a slender profile of a predetermined width range relative to the dimensions of the wearable device to at least maintain a maximum signal coupling for data transmission and to obtain a variable form factor.

3. The wearable device of claim 1, wherein the first set of conductors is mounted to one or more components of the wearable device and positioned in proximity to the user's body, and wherein the first set of conductors in the wearable device positioned in proximity to the user's body operates the wearable device in a sub-optimal mode through the electro-quasistatic (EQS) signals.

4. The wearable device of claim 1, wherein the second set of conductors is mounted to at least the portion of a connecting member, a mounting means, a set of support structures of the second support frame, and wherein the second set of conductors mounted to at least the portion of the connecting member, the mounting means, the set of support structures of the second support frame is positioned in proximity to the user's body by a predefined distance for transmitting the electro-quasistatic (EQS) signals on and around the user's body.

5. The wearable device of claim 1, wherein the second set of conductors mounted to the second support frame enables at least one second position vector associated with the second set of conductors to be oriented away from the user's body for operating the wearable device in a sub-optimal mode.

6. The wearable device of claim 1, wherein the second set of conductors mounted to at least the portion of the second support frame is operated in contact mode with the user's body during the operation of the wearable device, and wherein the second set of conductors operating in the contact mode with the user's body triggers galvanic-based electro-quasistatic (EQS) signal communication.

7. The wearable device of claim 1, wherein the predefined frequency range is about 0.1 MHz to 100 MHz.

8. A method, comprising:

generating, by a plurality of sensors, sensory data for transmission between a wearable device and at least one computing device associated with a user;

generating, by a processor, a data packet for transmission to the at least one computing device of the user, wherein the data packet is generated based at least on processing the sensory data captured by the plurality of sensors;

applying, by the processor, an excitation voltage between a first set of conductors and a second set of conductors for enabling at least the transmission of the data packet from the wearable device to the at least one computing device via electro-quasistatic (EQS) signals at a predefined frequency range, wherein, upon applying the excitation voltage, the first set of conductors generates the electro-quasistatic (EQS) signals and the second set of conductors applies the electro-quasistatic (EQS) signals to a user's body, for transmitting the data packet from the wearable device to the at least one computing device via human-body communication (HBC), and wherein the first set of conductors is mounted to an inner surface of at least a portion of a first support frame and is in contact with at least a head anatomy of the user during the operation of the wearable device, and wherein the first set of conductors mounted to an inner surface enables at least one first position vector associated with the first set of conductors to be oriented towards the user's body, and wherein the at least one first position vector associated with the first set of conductors enables human-body communication (HBC) by applying the electro-quasistatic (EQS) signals to the user's body; and triggering, by the processor, a feedback module associated with the wearable device to generate a notification in response to the successful transmission of the data packet to the at least one computing device.

9. The method of claim 8, wherein the first set of conductors is configured with a slender profile of a predetermined width range relative to the dimensions of the wearable device to at least maintain a maximum signal coupling for data transmission and to obtain a variable form factor.

10. The method of claim 8, wherein the first set of conductors is mounted to one or more components of the wearable device and positioned in proximity to the user's body, and wherein the first set of conductors in the wearable device positioned in proximity to the user's body operates the wearable device in a sub-optimal mode through the electro-quasistatic (EQS) signals.

11. The method of claim 8, wherein the second set of conductors is mounted to at least a portion of a connecting member, a mounting means, a set of support structures of a second support frame, and wherein the second set of conductors mounted to at least the portion of the connecting member, the mounting means, the set of support structures of the second support frame is positioned in proximity to the user's body by a predefined distance for transmitting the electro-quasistatic (EQS) signals on and around the user's body.

12. The method of claim 8, wherein the second set of conductors mounted to a second support frame enables at least one second position vector associated with the second set of conductors to be oriented away from the user's body for operating the wearable device in a sub-optimal mode.

13. The method of claim 8, wherein the second set of conductors mounted to at least a portion of a second support frame is operated in contact mode with the user's body during the operation of the wearable device, and wherein the second set of conductors operating in the contact mode with the user's body triggers galvanic-based electro-quasistatic (EQS) signals communication.

14. The method of claim 8, wherein the predefined frequency range is about 0.1 MHz to 100 MHz.

15. A non-transitory computer-readable medium comprising a processor-executable instructions that cause a processor to:

generate a data packet for transmission to the at least one computing device of the user, wherein the data packet is generated based at least on pre-processing the sensory data captured by the plurality of sensors;

apply an excitation voltage between a first set of conductors and a second set of conductors for enabling at least the transmission of the data packet from the wearable device to the at least one computing device via electro-quasistatic (EQS) signals at a predefined frequency range, wherein, upon applying the excitation voltage, the first set of conductors generates the electro-quasistatic (EQS) signals and the second set of conductors applies the electro-quasistatic (EQS) signals to a user's body, for transmitting the data packet from the wearable device to the at least one computing device via human-body communication (HBC), wherein the first set of conductors is mounted to an inner surface of at least a portion of a first support frame and is in contact with at least a head anatomy of the user during the operation of the wearable device, and wherein the first set of conductors mounted to an inner surface enables at least one first position vector associated with the first set of conductors to be oriented towards the user's body, and wherein the at least one first position vector associated with the first set of conductors enables human-body communication (HBC) by applying the electro-quasistatic (EQS) signals to the user's body; and trigger a feedback device associated with the wearable device to generate a notification in response to the successful transmission of the data packet to the at least one computing device.

16. The non-transitory computer-readable medium of claim 15, wherein the predefined frequency range is about 0.1 MHz to 100 MHz.

\* \* \* \* \*